US007007466B2

(12) United States Patent
Price

(10) Patent No.: US 7,007,466 B2
(45) Date of Patent: Mar. 7, 2006

(54) SYSTEM AND METHOD FOR CONTROLLING HYDRAULIC FLOW

(75) Inventor: Robert J. Price, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 75 days.

(21) Appl. No.: 10/024,260

(22) Filed: Dec. 21, 2001

(65) Prior Publication Data

US 2003/0115866 A1 Jun. 26, 2003

(51) Int. Cl.
*F16D 31/02* (2006.01)

(52) U.S. Cl. .......................................... 60/431; 60/433

(58) Field of Classification Search .................. 60/431, 60/433

See application file for complete search history.

(56) References Cited

U.S. PATENT DOCUMENTS 3,797,245 A 3/1974 Hein
4,475,333 A * 10/1984 Tordenmalm ................ 60/431
5,182,908 A * 2/1993 Devier et al. ................ 60/420
5,447,093 A 9/1995 Budzich
5,562,424 A 10/1996 Manring
5,567,123 A 10/1996 Childress et al.
5,800,130 A 9/1998 Blass et al.
6,305,162 B1 * 10/2001 Cobo et al. ................... 60/431

* cited by examiner

*Primary Examiner*—F. Daniel Lopez
(74) *Attorney, Agent, or Firm*—Finnegan, Henderson, Farabow, Garrett & Dunner LLP

(57) ABSTRACT

A method is provided for controlling hydraulic flow to a hydraulic actuator in fluid communication with a pump. The method includes generating a signal representative of a speed of the pump and selecting a relationship from a plurality of relationships between valve commands and an operator input. The selection is based upon the speed signal. A valve is modulated to control the hydraulic flow to the hydraulic actuator based on the selected relationship and the operator input.

21 Claims, 2 Drawing Sheets

SYSTEM AND METHOD FOR CONTROLLING HYDRAULIC FLOW

TECHNICAL FIELD

This invention relates to a method and system for controlling hydraulic flow. More particularly, the invention is directed to a method and system for controlling hydraulic flow to an actuator in fluid communication with a pump.

BACKGROUND

The hydraulic system of a machine, such as an excavator or a loader, typically includes a pump, a valve, and a hydraulic actuator in fluid communication. The hydraulic actuator may be a hydraulic cylinder, a hydraulic motor, or another device supplying motive power to a work implement or drive train of the machine. When an operator of the machine actuates a valve by, for example, moving a lever, pressurized hydraulic fluid flows from the pump to the hydraulic actuator through the valve to move a work element of the hydraulic actuator, such as a piston in a hydraulic cylinder.

The speed at which the hydraulic actuator moves is proportional to the rate of hydraulic flow through the valve, which in turn is a function of a valve position and pressure differential across the valve. Hydraulic flow to the hydraulic actuator can be controlled by changing the position of a valve spool located in the valve, but consideration must also be given to load pressure in the hydraulic actuator. For example, the hydraulic actuator may undesirably move much more quickly when lifting a light load than a heavy load at a single valve position, due to low pressure on the hydraulic actuator side of the valve. Traditionally, operators have compensated for this effect by reducing the engine speed and consequently the pump speed, thereby lowering pressurized fluid supply from the pump and the resultant pressure differential across the valve.

A variable displacement pump is often used in a machine. The variable displacement pump generally includes a drive shaft, a rotatable cylinder barrel having multiple piston bores, and pistons held against a tiltable swashplate biased by a centering spring. When the swashplate is tilted relative to the longitudinal axis of the drive shaft, the pistons reciprocate within the piston bores to produce a pumping action and discharge the pressurized hydraulic fluid.

It is well known in the hydraulic field to automatically control the swashplate angle of the pump such that the flow to the hydraulic actuator is maintained at a predetermined pressure, slightly higher than the maximum load pressure required by the system. This type of system is typically referred to as a pressure compensated pump.

By utilizing the output pressure to control the pump displacement, the variable displacement pump can reduce its pump displacement to a minimum level when no flow is required to move the actuator, i.e., when the valve is closed. In such a pump, reduction in pressure when the valve is opened causes the pump to increase the pump displacement to maintain the constant output pressure. However, under light load conditions the predetermined output pressure often results in a pressure differential across the valve causing device movements or acceleration faster than what the machine operator desires. Furthermore, reduction of the engine speed will not reduce the pump output, due to the automatic adjustment of the pump displacement to maintain the predetermined output pressure.

It is also known to provide load compensation by maintaining a predetermined differential pressure across the valve at any load pressure and consequently controlling the flow rate and actuator speed regardless of changing load conditions. In U.S. Pat. No. 5,447,093, a flow force compensation system is disclosed for maintaining a predetermined pressure differential across a directional valve. The system provides flow force compensation by a forced balancing device connected to a pressure compensated valve. The flow force compensation system may not, however, offer a desired flexibility in actuator response for different operations. Machine operators may prefer to have different response based on the operation performed. For example, an operator may prefer more rapid movement at a given control lever position when digging a trench than when craning a light object.

Thus, it is desirable to provide a hydraulic flow control system that provides flexible control of actuator response based on operational conditions. The present invention is directed to solving one or more of the problems associated with prior art designs.

SUMMARY OF THE INVENTION

In one aspect, a method is provided for controlling hydraulic flow to a hydraulic actuator in fluid communication with a pump. The method includes generating a signal representative of a speed of the pump and selecting a relationship from a plurality of relationships between valve commands and an operator input. The selection is based upon the speed signal. A valve is modulated to control the hydraulic flow to the hydraulic actuator based on the selected relationship and the operator input.

In another aspect, a system is provided for controlling hydraulic flow to a hydraulic actuator in fluid communication with a pump. The system includes a sensor assembly for generating a signal representative of a speed of the pump, an operator input device for providing an operator input, and a controller electrically coupled to the sensor assembly and the operator input device. The controller is configured to select a relationship from a plurality of relationships between valve commands and the operator input based on the speed signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention.

DETAILED DESCRIPTION

Reference will now be made in detail to an exemplary embodiment of the invention, which is illustrated in the accompanying drawings. Wherever possible, the same reference numbers will be used throughout the drawings to refer to the same or like parts.

Figure 1:
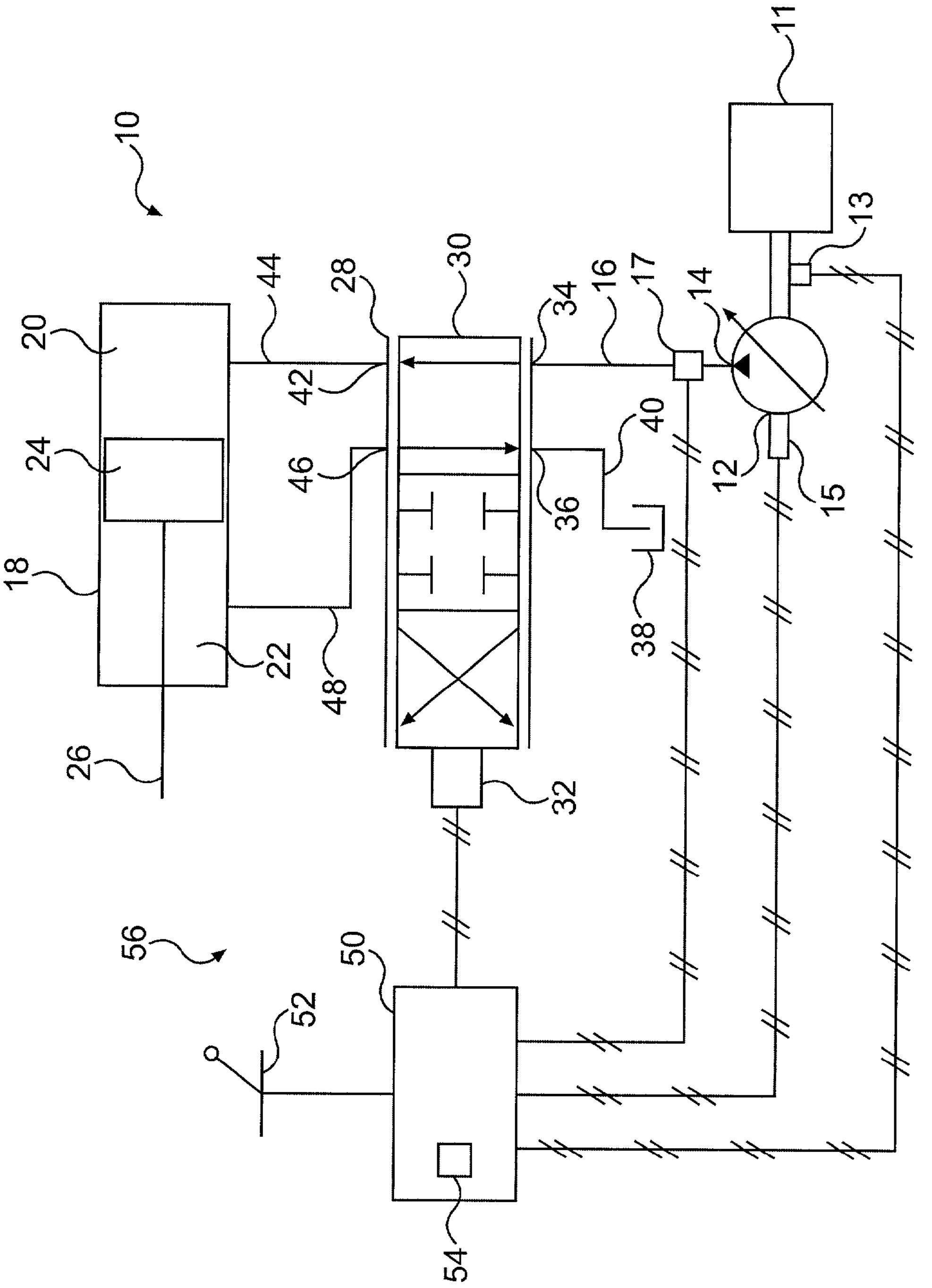
FIG. 1 is a schematic and diagrammatic representation of a machine having a hydraulic flow control system according to one exemplary embodiment of the present invention.

FIG. 1 schematically and diagrammatically illustrates a machine having a system for controlling hydraulic flow through a valve according to one exemplary embodiment of the invention. The machine 10 shown in FIG. 1 may be an excavator, a loader, or any other piece of equipment utilizing a hydraulic system to move a load. The machine 10 includes a pump 12 typically driven by a motor 11, such as an engine, via a drive train. In the exemplary embodiment shown in FIG. 1, the pump 12 is a variable displacement pump which can vary its displacement between minimum and maximum displacement positions. It should be appreciated however, that the present invention is also applicable to fixed displacement gear drive and piston pumps or the like. The pump 12 may be a pressure compensated pump and may have a pump control 15 to control the displacement of the pump 12 based on a pressure reading from a pressure sensor 17. Though the pump 12 in this exemplary embodiment has an electronic feedback to adjust the pump displacement based on the pressure reading, the pump 12 may utilize a suitable hydraulic feedback system, such as a pilot hydraulic line, to control the pump displacement. The pump 12 also has a pump outlet port 14 connected to a conduit 16.

In one exemplary embodiment, the machine 10 includes a hydraulic actuator such as a double-acting cylinder 18. The double-acting cylinder 18 has a pair of actuating chambers, namely a head-end actuating chamber 20 and a rod-end actuating chamber 22. The head-end actuating chamber 20 and the rod-end actuating chamber 22 are separated by a piston 24 having a piston rod 26. The double-acting cylinder 18 may be a hydraulic cylinder or any other suitable implement device used for raising, lowering, or otherwise moving a portion of the machine 10. Though the embodiment is described with respect to a hydraulic cylinder, this invention is not limited to a cylinder, and the machine 10 may include a hydraulic motor or any other suitable hydraulic actuator.

The machine 10 also includes a valve 28 connected to the pressure outlet port 14 of the pump 12 via the conduit 16. The valve 28 has a valve spool 30. In the embodiment shown in FIG. 1, the valve 28 is a proportional directional control valve. However, the invention is not limited to directional control valves, and the valve 28 can be any other suitable valve known to those skilled in the art. By means of example only, it is contemplated that the valve 28 may be a single spool valve or an independent metering valve (IMV). As is well known to those skilled in the art, an IMV typically has a plurality of independently operable valves that may be in fluid communication with a pump, a cylinder, a reservoir, and/or any other device present in a hydraulic circuit. The IMV allows independent metering of each of the valves to control hydraulic flow in multiple hydraulic paths. In one exemplary embodiment, each of the independently operable valves in the IMV may be independently controlled.

The machine 10 also has a valve actuator 32 to move the valve spool 30 to a desired position to thereby control the hydraulic flow through the valve 28. The displacement of the valve spool 30 changes the flow rate of the hydraulic fluid through the valve 28. The valve actuator 32 may be a solenoid actuator or any other actuator known to those skilled in the art.

In this exemplary embodiment, the valve 28 has a first port 34 connected to the pump 12 by the conduit 16, a second port 36 connected to a reservoir tank 38 by a conduit 40, a third port 42 connected to the head-end actuating chamber 20 of the cylinder 18 by a conduit 44, and a fourth port 46 connected to the rod-end actuating chamber 22 of the cylinder 18 by a conduit 48. The valve 28 of this exemplary embodiment has a closed position, a first position, and a second position. In the first position (shown in FIG. 1), the first port 34 and the third port 42 are in fluid communication, and the valve 28 passes the fluid from the pump 12 to the head-end actuating chamber 20 of the cylinder 18. At the same time, the second port 36 and the fourth port 46 are in fluid communication, and the valve 28 exhausts the fluid from the rod-end actuating chamber 22 to the reservoir tank 38.

Alternatively, in the second position (not shown in FIG. 1), the first port 34 and the fourth port 46 are in fluid communication so that the valve 28 passes the fluid from the pump 12 to the rod-end actuating chamber 22. Simultaneously, the second port 36 is in fluid communication with the third port 42 to pass the fluid from the head-end actuating chamber 20 to the reservoir tank 38. The valve spool 30 of the valve 28 can be moved by the valve actuator 32 to meter the fluid flow through the valve 28, as well as to move the valve 28 among the closed position, the first position, and the second position.

As illustrated in FIG. 1, the machine also includes a hydraulic flow control system 56 that has a speed sensor 13 to generate a signal representative of the speed of the pump 12. Though the exemplary embodiment in FIG. 1 illustrates the speed sensor 13 at the drive train that connects the motor 11 and the pump 12, the location of the speed sensor 13 of the present invention is not limited to the specific arrangement illustrated in FIG. 1. The sensor 13 can be placed at any location suitable to determine an actual or desired pump speed. In another exemplary embodiment, the speed of the motor 11, and consequently of the pump 12, may be controlled by a device, such as a lever, and the speed sensor 13 may monitor the desired speed of the pump 12 by sensing the position of the throttle lever. One skilled in the art will appreciate that any sensor assembly capable of ascertaining a monitored or desired speed of the pump 12 may be utilized.

The hydraulic flow control system 56 includes a controller 50 electrically coupled to the valve actuator 32, the pump sensor 13, and the pressure sensor 17. The controller 50 may receive a pressure reading from the pressure sensor 17 and send a signal to the pump control 15 to control the pump displacement. In the exemplary embodiment, the controller 50 receives the pump speed reading from the speed sensor 13. The controller 50 also sends an electrical command signal to the valve actuator 32. In response to the electrical command signal, the valve actuator 32 applies a varying force to controllably move the valve spool 30 to a desired displacement to control the hydraulic flow through the valve 28.

An operator input device 52, such as a lever, may be electrically connected to the controller 50, and an operator input command corresponding to the position of the lever may be sent from the operator input device 52 to the controller 50 to control hydraulic flow through the valve 28. By manipulating the operator input device 52, the operator can control the cylinder 18 in a desired manner.

In the embodiment shown in FIG. 1, the controller 50 includes a plurality of controllability relationships between a valve command and the operator input. Each of the relationships represents a range of commands to the valve actuator 32 that controls valve spool positions with respect to the operator input. As discussed above, hydraulic flow to the cylinder 18 and the resulting cylinder velocity will vary at a given valve spool position depending upon the pump output and load pressures. Accordingly, the valve commands may be defined in the controllability relationships as a percentage of maximum flow rate to the cylinder 18, maximum velocity of the cylinder 18, maximum current to actuator 32, or any other parameter that represents a position of the valve spool 30. The valve commands may be converted in a linearization table to an electrical current value supplied to actuator 32, in order to compensate for such things as a non-linear response of a solenoid valve actuator or non-linear increase in the size of the valve orifice across the range of the valve spool movement. In one exemplary embodiment, each of the relationships has a unique flow characteristic with respect to the operator input, and provides a unique actuator response for a given operator input.

In one exemplary embodiment, the operator input corresponds to a lever position. However, the operator input may be any other operator signal provided by the operator input device 52 representing a desired hydraulic flow through the valve 28 to an actuator 32.

Each of the controllability relationships between the valve command to the valve actuator 32 and the operator input determine a desired hydraulic flow characteristic with respect to the operator input. For example, each relationship may be represented by a graph, an algorithm, or a map that exhibits a desired valve spool position in response to an operator lever position. One of a plurality of controllability relationships is selected based on a signal representative of pump speed, for example by associating each curve or map with a range of pump speeds, or by varying the coefficients or constants in an algorithm defining the relationship between lever position and a valve command or the like.

Figure 2:
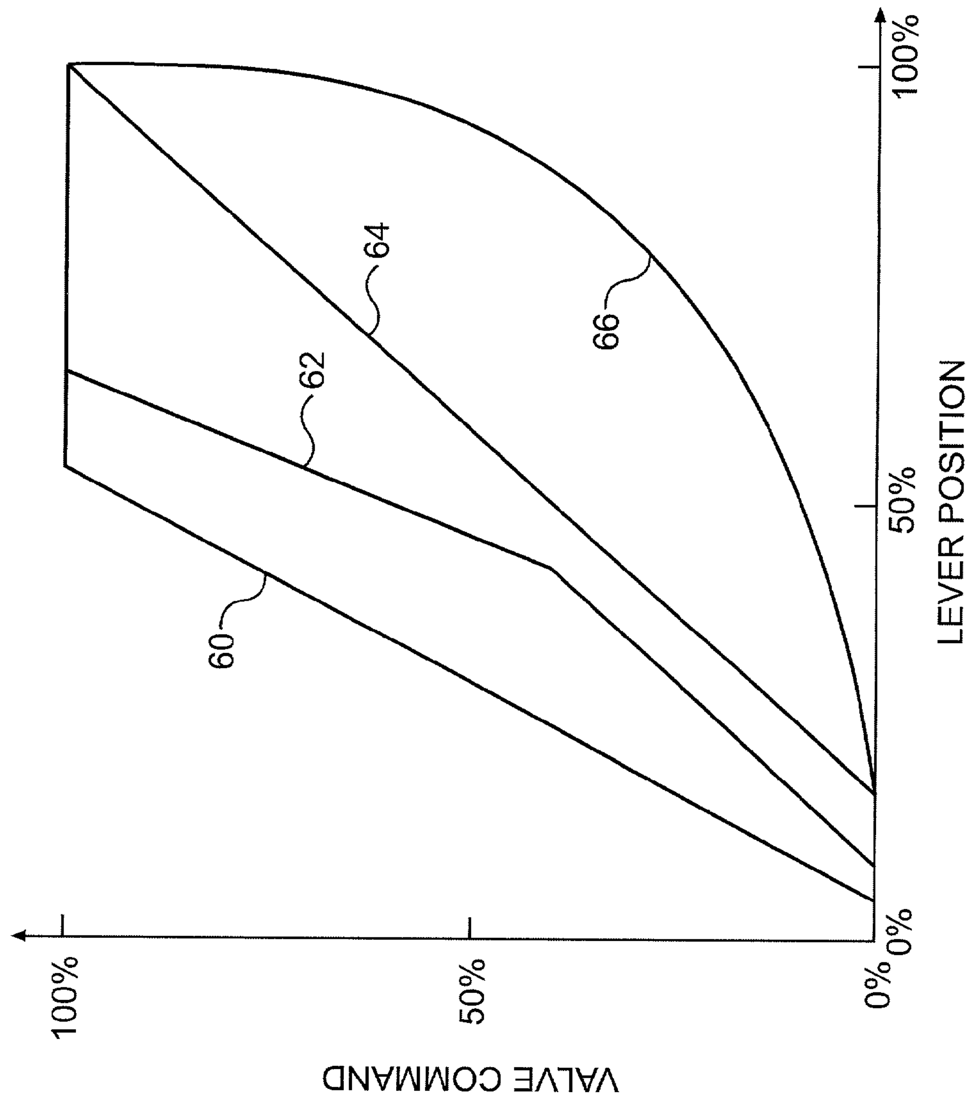
FIG. 2 is a graphical representation of various valve command and operator input relationships of the exemplary hydraulic flow control system of FIG. 1.

FIG. 2 illustrates a valve command and operator input graph having exemplary curves or lines that represent different relationships between the operator input (eg. lever position) and the resulting desired valve command to the valve actuator 32. As shown in FIG. 2, each line or curve may provide a different flow characteristic to the cylinder 18 for a given lever position. For a given lever position, 5%, 10%, 25%, 50% or any other percentage of the maximum flow may be provided depending on a curve or line selected in response to the signal representing pump speed. Also, each of the curves and lines provides a different rate of change in the flow for a given change in the lever position. For example, one graph may provide an exponential change in the flow with respect to the change in the lever position, and another graph may provide a proportional increase in the flow with respect to the change in the lever position.

The shape of the curve or the slope of the line may be determined to be suitable for a particular application of the machine 10. For example, if the machine 10 is used to crane a light object, the operator may wish to have a smooth and slow response time for the cylinder 18, i.e., a relatively slow increase in flow rate, with respect to the change in the lever position. On the other hand, if the machine 10 is used to dig a trench, the operator may wish to have a faster response time for the cylinder 18.

In one exemplary embodiment, the controller 50 may be preprogrammed with the plurality of the relationships between the hydraulic flow and the operator input, and the controller 50 may have a multidimensional map or table that contains the relationships. The map or table may be created prior to the operation of the machine 10, for example, during either a test run of the hydraulic flow control system 56 or a lab test, and may be prestored in a memory 54 in the controller 50.

In another embodiment, the controller 50 may store one or more mathematical equations that provide the plurality of the relationships. Each equation may define the valve command as a function of the operator input. For example, one equation may define the flow in a linear relationship with the operator input, and another equation may define the flow in an exponential relationship with the operator input.

In the embodiment shown in FIG. 1, the controller 50 selects one relationship from the plurality of the controllability relationships between the valve command and operator input based on the pump speed reading from the pump speed sensor 13. For example, when the pump speed is slow, the controller 50 may be programmed to select a curve or line having a gradual slope or shape to provide a smooth and slow actuator response with respect to the change in the lever position. When the pump speed is fast, the controller 50 may be programmed to select a curve or slope having a steep slope or shape. Based on the magnitude of the pump speed, the controller may select the corresponding relationship between the valve command and operator input.

INDUSTRIAL APPLICABILITY

Referring to FIG. 1, the pump speed sensor 13 monitors the speed of the pump 12 or the motor 11. The pump speed reading or signal for the pump speed sensor 13 is fed to the controller 50.

The controller 50 may include a plurality of valve command and operator input relationships. As shown in the exemplary embodiment of FIGS. 1 and 2, the operator input is a lever position provided by the operator input device 52, and the valve command is expressed in terms of a percentage of maximum flow or actuator velocity.

The controller 50 includes multiple valve command and operator input relationships suitable for different applications of the machine 10. As shown in FIG. 2, the controller 50 in this embodiment includes various valve command and operator input relationships 60, 62, 64, 66 depicted by the diagrams. FIG. 2 shows the relationships as a plurality of curves or lines on a graph. The relationships may also be expressed by, for example, a map (look-up table) or mathematical equations.

Based on the pump speed reading from the pump speed sensor 13, the controller 50 selects one relationship from the plurality of the relationships between the valve command and operator input. For example, when the pump speed is at 1000 r.p.m., the controller 50 may be programmed to select a curve or line 66 that provides 10% of the maximum flow with 50% of the maximum lever position. As another example, when the pump speed is at 2500 r.p.m., the controller 50 may be programmed to select another curve 64 that provides 40% of the maximum flow at the same lever position.

By using the selected relationship and the operator input, the controller 50 computes a command signal to the valve actuator 32 and modulates the flow based on the lever position according to the selected curve. By varying the engine speed and correspondingly, the pump speed, the operator can alter the controllability relationship in a desired manner.

Accordingly, the present invention provides a hydraulic flow control system that provides flexible control of actuator response based on operational conditions. The hydraulic flow control system according to this invention can provide flexible control of hydraulic flow in a variety of work machines and under a variety of conditions.

It will be apparent to those skilled in the art that various modifications and variations can be made in the flow control system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling hydraulic flow to a hydraulic actuator in fluid communication with a variable displacement pump via a valve, the method comprising:

generating a signal representative of a speed of the pump;

selecting a relationship from a plurality of relationships between valve commands and an operator input, the plurality of relationships being configured to provide various actuator responses with respect to the operator input, wherein the plurality of relationships has a more gradual curve or slope as the speed of the pump is reduced, throughout a whole range of the operator input, the selection being based upon the speed signal; and modulating a valve to control the hydraulic flow to the hydraulic actuator based on the selected relationship and the operator input.

2. The method of claim 1, further including determining the plurality of relationships between the valve commands and the operator input, each of the plurality of relationships representing a valve spool position as a percentage of maximum flow with respect to the operator input.

3. The method of claim 2, further including generating a map including the plurality of relationships between the valve commands and the operator input.

4. The method of claim 3, further including storing the map in a memory.

5. The method of claim 2, wherein the plurality of relationships between the valve commands and the operator input are determined by mathematical equations.

6. The method of claim 1, wherein each of the plurality of relationships between the valve commands and the operator input is represented by a valve command and operator input graph.

7. The method of claim 1, wherein the operator input is a position of a lever for operating the actuator.

8. The method of claim 1, further including monitoring the speed of the pump.

9. The method of claim 1, further including monitoring a speed of a motor coupled to the pump, the signal representative of the speed of the pump being the speed of the motor.

10. A system for controlling hydraulic flow to a hydraulic actuator in fluid communication with a variable displacement pump via a valve, the system comprising:

a sensor assembly for generating a signal representative of a speed of the pump;

an operator input device for providing an operator input; and a controller electrically coupled to the sensor assembly and the operator input device, the controller being configured to select a relationship from a plurality of relationships between valve commands and the operator input based on the speed signal, the plurality of relationships being configured to provide various actuator responses with respect to the operator input, wherein the plurality of relationships has a more gradual curve or slope as the speed of the pump is reduced, throughout a whole range of the operator input.

11. The system of claim 10, wherein each of the plurality of the relationships represents a valve spool position as a percentage of maximum flow with respect to operator input.

12. The system of claim 10, wherein the controller is configured to modulate the valve commands based on the selected relationship and the operator input.

13. The system of claim 12, wherein the controller is coupled to a valve in fluid communication with the hydraulic actuator and the pump, the controller being configured to modulate the valve to control the hydraulic flow to the hydraulic actuator.

14. The system of claim 10, wherein the controller is preprogrammed with the plurality of relationships.

15. The system of claim 14, wherein the controller includes a map having the plurality of relationships.

16. The system of claim 14, wherein the controller includes mathematical equations to provide the plurality of relationships.

17. The system of claim 10, wherein the operator input device is a lever and the operator input corresponds to a position of the lever.

18. The system of claim 10, wherein the sensor assembly monitors the speed of the pump.

19. The system of claim 10, wherein the sensor assembly monitors a speed of a motor coupled to the pump, and the signal representative of the speed of the pump is the speed of the motor.

20. The system of claim 10, wherein the pump is a pressure compensated, variable displacement pump.

21. A machine for moving a load, comprising:

a variable displacement pump;

a hydraulic actuator in fluid communication with the pump;

a valve in fluid communication with the pump and the hydraulic actuator;

a sensor assembly for generating a signal representative of a speed of the pump;

an operator input device for providing an operator input; and a controller electrically coupled to the sensor assembly and the operator input device, the controller being configured to select a relationship from a plurality of relationships between valve commands and the operator input based on the speed signal, the plurality of relationships being configured to provide various actuator responses with respect to the operator input, wherein the plurality of relationships has a more gradual curve or slope as the speed of the pump is reduced, throughout a whole range of the operator input.

* * * * *